US011559904B2

(12) United States Patent
Cambruzzi et al.

(10) Patent No.: US 11,559,904 B2
(45) Date of Patent: Jan. 24, 2023

(54) SCREWING DEVICE AND METHOD FOR SCREWING A SCREW INTO A WALL

(71) Applicant: Inventio AG, Hergiswil (CH)

(72) Inventors: Andrea Cambruzzi, Zurich (CH); Philipp Zimmerli, Harkingen (CH); Raphael Bitzi, Lucerne (CH); Erich Butler, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 1284 days.

(21) Appl. No.: 15/776,194

(22) PCT Filed: Nov. 18, 2016

(86) PCT No.: PCT/EP2016/078096
§ 371 (c)(1),
(2) Date: May 15, 2018

(87) PCT Pub. No.: WO2017/085239
PCT Pub. Date: May 26, 2017

(65) Prior Publication Data
US 2020/0254628 A1 Aug. 13, 2020

(30) Foreign Application Priority Data
Nov. 19, 2015 (EP) .................................. 15195407

(51) Int. Cl.
*B25J 15/04* (2006.01)
*B23P 19/06* (2006.01)
(Continued)

(52) U.S. Cl.
CPC .............. *B25J 15/04* (2013.01); *B23P 19/06* (2013.01); *B25J 17/0225* (2013.01); *B25J 19/0091* (2013.01); *B25B 21/00* (2013.01)

(58) Field of Classification Search
CPC . B25J 15/04; B25J 15/045; B25J 17/02; B25J 17/0225; B23P 19/00; B23P 19/02; B23P 19/06; B23P 19/0091; B25B 21/00
(Continued)

(56) References Cited

U.S. PATENT DOCUMENTS 4,637,775 A * 1/1987 Kato ....................... B24B 27/04
901/41
4,918,991 A * 4/1990 Bucher ................ B25J 17/0208
976/DIG. 231
(Continued)

FOREIGN PATENT DOCUMENTS

CN 102186638 A 9/2011
CN 103209810 A 7/2013
(Continued)

OTHER PUBLICATIONS

JP-2010264514 Machine Translation (Year: 2010).*

*Primary Examiner* — Lee D Wilson
*Assistant Examiner* — Alberto Saenz
(74) *Attorney, Agent, or Firm* — William J. Clemens; Shumaker, Loop & Kendrick, LLP

(57) ABSTRACT

A screwing device includes a screwdriver and a connection element for coupling the screwdriver to a robot arm. The connection element has a first robot-side transmission element, a second tool-side transmission element, a restoring element arranged between the first and second transmission elements, and a distance measuring element. The two transmission elements can be moved towards each other against a restoring force of the restoring element in an actuation direction. The distance measuring element measures a distance that represents the spacing between the transmission elements in the actuation direction and is used to control the actuating force acting on the screwdriver.

13 Claims, 2 Drawing Sheets

(51) Int. Cl.
*B25J 17/02* (2006.01)
*B25J 19/00* (2006.01)
*B25B 21/00* (2006.01)

(58) Field of Classification Search
USPC .............................. 81/57.4, 180.1, 181, 182
See application file for complete search history.

(56) References Cited

U.S. PATENT DOCUMENTS

| | | | | |
|---|---|---|---|---|
| 5,421,696 | A | * | 6/1995 | Stephan ............... B25J 17/0208 901/29 |
| 8,606,398 | B2 | * | 12/2013 | Eakins ................... B25J 13/085 901/29 |
| 2015/0298321 | A1 | * | 10/2015 | Gross ................ G01N 35/0099 422/67 |

FOREIGN PATENT DOCUMENTS

| | | | |
|---|---|---|---|
| DE | 10011854 | A1 | 9/2001 |
| DE | 202011103223 | U1 | 12/2012 |
| EP | 0421323 | A1 | 10/1991 |
| JP | 2010264514 | A * | 11/2010 |
| JP | 2010264514 | A | 11/2010 |
| WO | 2010024794 | A1 | 3/2010 |

\* cited by examiner

SCREWING DEVICE AND METHOD FOR SCREWING A SCREW INTO A WALL

FIELD

The invention relates to a screwing device for coupling to a robot arm and to a method for screwing a screw into a wall using the screwing device.

BACKGROUND

WO 2010/24794 A1 discloses a connection element between a gripper and a robot arm of an industrial robot. The industrial robot is intended to be able, due to the combination of the gripper and the connection element, to pick up parts lying haphazardly in a container. For this purpose, the connection element comprises, for example, a rubber bladder arranged between two transmission elements. Moreover, the connection element comprises proximity sensors, a spacing between the two transmission elements being determined in order to determine an actuating force.

JP 2010 264514 A discloses a screwing device and a method for screwing a screw into a workpiece. The screwing device comprises a force sensor, for example in the form of a load cell. When a screw is screwed into a workpiece, a desired actuating force is set.

EP 0 421 323 B1 discloses a connection element for coupling a tool, in the form of a grinding head for grinding a surface of a workpiece, to a robot arm. The connection element comprises a force sensor in the form of a strain gauge for measuring a force acting on the grinding head. A position of the grinding head can in addition be determined. The force and position are regulated on the basis thereof. Grinding the surface of a tool is a comparatively uniform process, and therefore the force acting on the grinding head can be measured reliably and without significant impact from disturbance variables, and can be used for regulating the force.

There are also applications, however, in which disturbance variables such as force pulses in the form of impacts or vibrations act on a tool coupled to a robot arm and thus make direct force measurement, for example using a strain gauge, significantly more difficult or even impossible. Disturbance variables of this kind arise, for example, when screwing a screw into a solid wall, in particular into a concrete wall.

SUMMARY

In contrast, an object of the invention is in particular that of proposing a screwing device comprising a screwing device and a connection element for coupling a tool to a robot arm, which device allows for simple and/or sound determination of a variable that is characteristic of a force on the screwdriver. In addition, an object of the invention is in particular that of proposing a method for screwing a screw into a wall using a screwing device attached to a robot arm, which method allows the screw to be reliably screwed in.

The screwing device according to the invention comprises a connection element for coupling a screwdriver to a robot arm, the connection element having a first robot-side transmission element, a second tool-side transmission element, a restoring element arranged between the first and second transmission element, and a distance measuring element. The two transmission elements can be moved towards each other, in an actuation direction, against a restoring force of the restoring element, i.e. by applying an actuating force. The distance measuring element is designed and arranged so as to be able to measure a distance which represents a spacing between the transmission elements in the actuation direction. The screwdriver is used in particular for screwing screws into a wall.

Since the two transmission elements can be moved towards each other only against the mentioned restoring force of the restoring element, the distance measured by the distance measuring element is a measure of the mentioned actuating force with which the two transmission elements are pressed together. The actuating force balances a force acting on the screwdriver against the actuation direction, and therefore the measured distance is also a measure of the force acting on the screwdriver. Therefore, the actuating force and the force acting on the screwdriver can be indirectly measured in a very sound and reliable manner.

The combination of the distance measuring and the restoring element ensures that the indirect identification of the actuating force is very resistant to shocks and vibrations. This applies in particular when the distance measurement is carried out in a contactless manner. The measured spacing is thus a variable exposed to fewer disturbance variables and can therefore be used in particular as a controlled variable of a regulation, in particular a regulation of the position of the robot arm, when transmitted to a controller of the robot arm. The measured spacing and, indirectly, the actuating force and the force on the screwdriver can thus be adjusted, in a reliable and sound manner, to a desired value or to a desired course.

The connection element described may be coupled not only to a screwdriver but also to another tool. In this case, a tool is to be understood as an element by means of which an object can be machined or gripped and moved. The tool can be designed as a power drill, a milling cutter or as a gripper, for example. The tool can be designed as a stand-alone tool, for example as a power drill comprising an in-built drive. It is also possible, however, for the robot arm to comprise a drive for the tool, and for the tool to then be designed just as a simple drill for example.

In this case, a robot arm is to be understood as an actively movable element of a mechatronic component. A mechatronic component comprises interacting mechanical, electronic and information technology elements or modules, and can in particular be designed as an industrial robot.

An industrial robot can be understood to be a universal, usually programmable, machine for handling, assembling and/or machining workpieces and components. Robots of this kind are designed to be used in an industrial environment and have, up to now, been used for example in large scale industrial manufacturing of complex goods, for example in automotive manufacturing.

An industrial robot usually comprises what is known as a manipulator, in the form of a robot arm, what is known as an effector, and a controller. The robot arm may be pivotable about one or more axes for example, and/or movable in one or more directions. In the present case, the effector may be a tool within the meaning described above, or also similar. The controller can be used to appropriately actuate, i.e. for example to appropriately move and/or guide, the manipulator and/or the effector, and to thus also apply a specified actuating force.

Following initial programming, an industrial robot is usually capable of carrying out a work flow semi-automatically or fully automatically, i.e. substantially autonomously. In this case, implementation of a work flow can be varied within specific limits, for example depending on sensor information. Moreover, a controller of an industrial robot may optionally also be designed to be self-learning.

The two transmission elements of the connection element are in particular discoid or cylindrical, in particular hollow cylindrical. The distance measuring element is arranged so as to be fixed relative to one of the transmission elements, and measures the distance, in actuation direction, from the other transmission element or an element that is connected, in a fixed manner, to the other transmission element. The measured distance is thus a measure of the spacing between the two transmission elements in the actuation direction. When the position of the distance measuring device relative to the first transmission element, and the position of the component, relative to which the distance is measured, with respect to the second transmission element is known, the mutual spacing of the two transmission elements in the actuation direction can be calculated. In this case, the distance measuring device can be based on different measuring principles, such as ultrasound, laser, infrared, etc.

In an embodiment of the invention, the restoring element is designed as at least a spring, in particular as a linear spring. The springs are designed in particular as helical springs, other types of springs, for example disk springs, also being possible. A plurality of springs can also be used, which springs are arranged in particular so as to be mutually parallel. The one or more springs are oriented in the actuation direction, so as to be compressed in the spring direction when the two transmission elements are moved towards each other in the actuation direction, i.e. the spacing therebetween reduces.

In the case of springs, there is a correlation between what is known as a spring excursion and a spring force, in the form of a restoring force, it being possible for the spring excursion to result from the spring being stretched or compressed. In the case of a linear spring, there is an at least approximately linear correlation between the spring excursion and the restoring force, such that the restoring force can be determined from a measured spring excursion by means of division by what is known as the spring constant of the spring. Thus, a desired restoring force can be set, for example adjusted, by setting a specific spring excursion. In the present case, a desired spring force and thus actuating force on the tool can be set by setting a specified spacing between the two transmission elements. This also applies to the use of non-linear springs, in which there is a non-linear correlation between the spring excursion and the spring force.

In an embodiment of the invention, the spring is designed as a helical spring which is arranged around a fastening element, i.e. through the hollow interior of which spring a fastening element extends, which element connects the first and second transmission element and defines the possible spacing between the first and second transmission element. Thus, the springs are guided and secured and, simultaneously, the two transmission elements are connected, in a simple manner. The fastening element is in particular designed as a screw comprising a screw head and a shank. One of the transmission elements, for example the first transmission element, comprises a stepped through-hole which is designed such that the shank can be guided through the hole and the screw head can rest on the stepping. The second transmission element comprises a threaded hole into which the shank of the screw is screwed. The screw thus connects the two transmission elements and defines the mutual spacing of the two transmission elements by means of the interaction of the screw head with the stepping of the through-hole. At the same time, the two transmission elements can be moved towards each other.

In an embodiment of the invention, a distance sensor of the distance measuring element is arranged so as to be fixed relative to the first transmission element, and the distance measuring element measures a spacing from the second transmission element. In addition to the distance sensor, the distance measuring element also comprises an evaluation unit, which is likewise arranged so as to be fixed relative to the first transmission element. The distance sensor and the evaluation unit may be combined in one unit or may also be mutually separate. The fixed connection to the first transmission element also connects the distance sensor to the robot arm in a fixed manner, allowing secure connection to the robot arm.

In an embodiment of the invention, the distance measuring element comprises an optical distance sensor which is based in particular on a laser distance measurement. Distance measuring elements of this kind are simply constructed but also very precise. Said elements are also commercially available in large quantities and in different designs.

In an embodiment of the invention, the first and the second transmission element are coupled by means of a guide. The guide is designed and arranged such that a displacement of the two transmission elements relative to one another is possible only in the actuation direction, any play which may be present in the guide being negligible. This ensures that, when the robot arm moves in the actuation direction, the tool is also moved only in the actuation direction and that there is not also an undesired movement transversely to the actuation direction. This is important when using some tools, for example a power drill or a screwdriver.

In the simplest case, the mentioned guide is formed by a pin that is fastened to one of the transmission elements and is oriented in the actuation direction, and a corresponding recess that is formed in the other transmission element and in which the pin can be inserted with as little play as possible.

In an embodiment of the invention, the guide comprises at least one ball retainer which is arranged between the two transmission elements and so as to be in parallel with the actuation direction. A ball retainer consists of an in particular hollow cylindrical main element comprising recesses in which individual balls are arranged so as to be freely rotatable and protrude beyond the main element towards the inside and towards the outside. This makes particularly precise and low-friction guidance possible. This allows both a very exact movement of the tool in the actuation direction, and an exact setting, for example regulation, of a desired spacing between the two transmission elements, and thus a desired actuating force.

In this case, in addition to the ball retainer, the guide comprises a cylindrical guide rod that is arranged on one of the transmission elements and is oriented in the actuation direction, and a hollow cylindrical guide bush that is arranged on the other transmission element and in which the guide rod can be inserted. The ball retainer is arranged between the guide rod and the guide bush.

In an embodiment of the invention, the connection element comprises a damper which damps impacts introduced by the tool. The damping of the impacts both protects the components of the connection element and of the robot arm, and improves in particular the setting or adjustability of the spacing between the two transmission elements.

The damper is designed for example as one or more parallel rubber buffers which are commercially available in large quantities and at a low cost. It is also possible, however, for the damper to be designed as a telescopic damper.

Instead of the combination of the two transmission elements and the restoring element and damper, the connection element can also comprise just a damper. A connection element of this kind can be used when it is not essential to set the actuating force, but damping of the impacts in the actuation direction is desired in order to protect the components. A connection element of this kind can be used for example for connection to a hammer drill. When drilling using a hammer drill, significant impacts occur, it not being essential, however, to set a specific actuating force.

In an embodiment of the invention, the damper is arranged in the force flow between the screwdriver and a connector element that makes connection to the robot arm possible. Particularly effective damping is possible on account of the damper being arranged in the force flow between the screwdriver and the connector element. In this case, being arranged in the force flow is to be understood to mean that the damper absorbs a force acting on the screwdriver and transfers said force to the connector element and thus to the robot arm.

In an embodiment of the invention, the damper comprises a guide which is designed and arranged such that a deformation of the damper transversely to the actuation direction is impossible, any play which may be present in the guide being negligible. The guide thus allows only allows deformation of the damper in the actuation direction and/or by means of a rotation about the actuation direction. When the tool is designed as a hammer drill, damping in the actuation direction is important in particular. When the tool is designed as an impact wrench, damping in the mentioned direction of rotation is important in particular.

This ensures that, when the robot arm moves in the actuation direction, the tool is also moved only in the actuation direction and that there is not also an undesired movement transversely to the actuation direction. This is important when using some tools, for example a power drill or a screwdriver.

If the damper is designed as a telescopic damper, insertion of a piston rod into a cylinder of the telescopic damper is also be understood as a deformation of the damper.

In an embodiment of the invention, the damper is arranged on a side opposing the first transmission element and thus on the tool side of the second transmission element, relative to the second transmission element. Thus, impacts introduced by the tool are already damped when they reach the second transmission element, as a result of which the distance measurement and thus also setting of a desired spacing is affected as little as possible and can therefore be carried out very precisely.

The connection element could also be able to be coupled using different tools. The connection element would thus be able to be used in a very flexible manner. Said element could be designed in particular so as to be able to be coupled using commercially available, hand-actuated tools, such as screwdrivers or power drills. The connection element can optionally also comprise adapter elements that can be adapted to the particular shape of a handle of the tool. In addition to the flexible usage, this also allows for cost-effective implementation, since the mentioned tools are commercially available in large quantities and at comparatively low prices.

It is also possible, however, for the connection element and the tool to form an inseparable unit which has a specific application purpose and is optimized therefor.

In an embodiment of the invention, the connection element comprises a quick-change connector. Said connector is designed such that the connection element can be coupled to a robot arm using the quick-change connector, without manual intervention. The robot arm can thus be simply and quickly coupled to different connection elements, and thus to different tools. A robot arm can thus automatically carry out different work using different tools without manual intervention by a fitter. This allows particularly flexible and also cost-effective use of the robot arm.

The quick-change connector can be pneumatically actuated for example, it being possible for a positive connection between the robot arm and the connection element to be established by means of applying compressed air. Quick-change connectors of this kind are known and are commercially available.

The above object is achieved by a method for screwing a screw into a wall using a screwing device guided by a robot arm, the screwing device being guided towards the wall at an actuating force in an actuation direction, a variable that is characteristic of the actuating force being sensed while the screwing device is guided towards the wall, and the screwing device being actuated such that the mentioned variable is within a specifiable range and is in particular constant. The mentioned method makes it possible to safely screw in the screw, while both the contact between the screwing device and the screw remains constant during the entire screwing process, and the risk of jamming and thus blocking of the screw is also very low.

In this context, the mentioned actuation of the screwing device is to be understood as both guiding, i.e. moving, the screwing device in particular towards the wall, and also a set rotational speed of the screwing device and thus of a screw screwed by the screwing device.

On account of the thread of the screw, a rotating screw moves autonomously into a fastening hole. If a screwing device does not follow quickly enough, the contact between the screwing device and the screw may be lost and the screwing device may need to be placed on again. This wastes time and, in the present case of a screwing device guided by a robot arm, can also be achieved only very laboriously. If the screwing device is moved into the fastening hole, and thus in the actuation direction, too rapidly in relation to the rotational speed of the screwing device and thus the rotational speed of the screw, the actuating force may become too large and the screw may jam and the screwing process may be blocked. The screwing process must then be interrupted and the screw may need to be screwed out again a little way. This likewise wastes time and, in the present case of a screwing device guided by a robot arm, can likewise be achieved only very laboriously.

The inventors have identified that the above-mentioned problems can be prevented and the screw can be screwed in safely and reliably by means of the sensing, according to the invention, of a variable that is characteristic of the actuating force, and the actuation of the screwing device such that the mentioned variable is within a specifiable range, and by selecting the mentioned range accordingly. The mentioned range is dependent on various factors, such as the tool used, the type of screws and the nature of the wall. Said range may be selected, for example, such that the actuating force is between 20 and 100 N, in particular is approximately 50 N.

The mentioned variable can be set by means of changing the guide, i.e. changing the position of the screwing device and thus of the robot arm. If the actuating force becomes too great, the screwing device is moved towards the wall more slowly for example. Alternatively, the mentioned variable can be set by means of changing the rotational speed of the screwing device and thus the rotational speed of the screw. Changing the rotational speed also changes the speed at which the screw moves towards the wall. If the actuating force is too great, the rotational speed is then increased and the screw moves towards the wall more quickly, such that the actuating force decreases while the screwing device moves uniformly towards the wall. If the actuating force is too low, the rotational speed is decreased. It is also possible for both the guide of the screwing device and the rotational speed thereof to be changed. The mentioned variable is set in particular by means of regulation, specifically by means of PID (proportional-integral-derivative) control.

The variable that is characteristic of the actuating force can, for example, be a spring excursion of a spring that is arranged between the robot arm and the screwing device and is oriented in the actuation direction. Other variables are also conceivable, however.

In this context, a screwing device or a screwdriver is to be understood to be a machine that comprises an in particular electric drive and can be coupled to a screw head and by means of which a screw can be caused to rotate.

The screw is in particular screwed into a fastening hole, in the form of a drilled hole, in the wall. The screw can be designed as what is known as a screw anchor or a screwed insert for example, which can be screwed into a fastening hole directly, and thus without an insert previously being introduced. Other kinds of screws are also conceivable, however.

The explanations above, given in the context of the connection element, apply to the robot arm used in the method according to the invention.

The connection between the robot arm and the screwing device is established by means of a connection element described above, and the distance measured by the distance measuring device is used as the variable that is characteristic of the actuating force.

The method according to the invention can be used in particular when fixing an elevator parts support in an elevator shaft in an elevator system. The elevator parts support is in particular designed as a lower portion of a rail bracket, to which an upper portion of a rail bracket can be fastened, to which upper portion a guide rail for a car of the elevator system is then fastened. The elevator parts support may, however, also be provided for retaining other components, for example a guide rail of a counterweight in an elevator shaft. The component of an elevator system retained by the elevator parts support can be connected to the elevator parts support directly or, as described, using an intermediate part. A method for fixing an elevator parts support in an elevator shaft of an elevator system is described in the unpublished European patent application having application number 15193501.2, the content of which is hereby incorporated into this application.

Further advantages, features and details of the invention are found in the following description of embodiments and in the drawings, in which the same or functionally similar elements are provided with identical reference signs.

DETAILED DESCRIPTION

Figure 1:
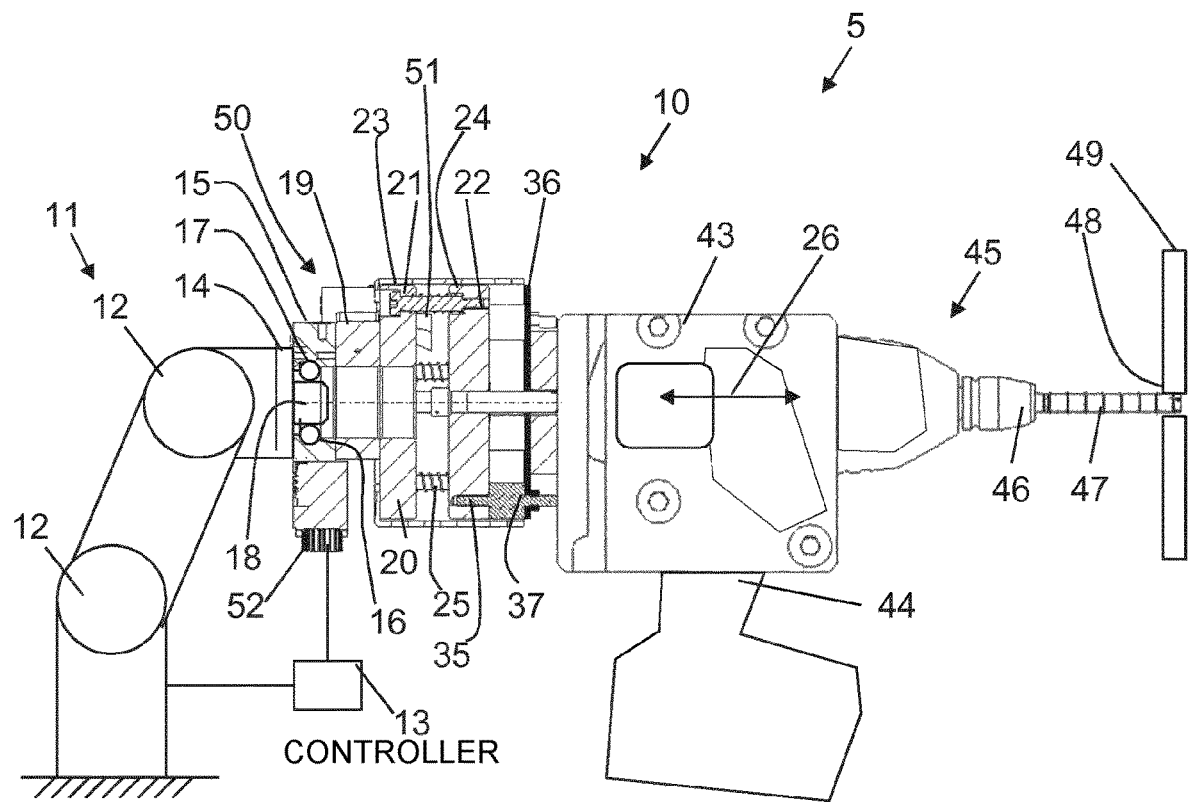
FIG. 1 shows a screwing device connected to a robot arm.

According to FIG. 1, a connection element 10 is connected to a robot arm 11 which, in this view, comprises just two joints 12. The robot arm 11 is actuated by a robot controller 13 so as to be able to move to different positions in a controlled manner. The structure and the operating principle of robot arms and robot controllers are generally known and therefore not discussed in more detail here.

A robot-side, first quick-change connector 14 of a quick-change system is arranged on the robot arm 11, which connector interacts with a connection element-side, second quick-change connector 15 of the connection element 10. The second quick-change connector 15 is substantially hollow cylindrical and comprises an inner peripheral groove 16 in which balls 17 that are connected to the first quick-change connector 14 by means of a retainer (not shown in greater detail) can engage. The first quick-change connector 14 further comprises a punch 18 that is actuated by compressed air and that can be extended towards the connection element 10 and retracted in the opposite direction. During extension towards the connection element 10, the balls 17 are pressed into the groove 16 of the second quick-change connector 15 and a positive connection is thus established between the two quick-change connectors 14, 15 and therefore between the robot arm 11 and the connection element 10.

As a result, the robot arm 11 is coupled to the connection element 10. If the connection is intended to be released again, the punch 18 is retracted again and the balls 17 can be moved inwards again and leave the groove 16. The robot arm 11 can them be moved away from the connection element 10 and separated therefrom. The connection and release described can be carried out fully automatically without manual intervention by a worker or fitter.

A substantially hollow cylindrical intermediate element 19, which is connected to a first, robot-side transmission element 20 on the opposite side, adjoins the second quick-change connector 15. The first transmission element 20 is likewise hollow cylindrical and is connected to a second, tool-side transmission element 22 by means of a total of six fastening elements in the form of screws 21. The second transmission element 22 is likewise substantially hollow cylindrical and is arranged so as to be coaxial to the first transmission element 20. Only three of the total of six uniformly distributed screws 21 can be seen in the cross section shown.

In order to ensure the connection of the two transmission elements 20, 22 and at the same time to allow the two transmission elements 20, 22 to be able to move towards each other, the first transmission element 20 comprises stepped through-holes 23, through which a shank of the screws 21 passes, and a screw head rests on the stepping. The diameter of the through-holes 23 is such that the first transmission element 20 can be displaced relative to the screw shanks. The second transmission element 22 comprises corresponding threaded holes 24 into which the screws 21 are screwed in part.

The screws 21, together with the stepped through-holes 23 and the threaded holes 24, thus define a possible spacing between the two transmission elements 20, 22. A restoring element in the form of a linear helical spring 25 is in each case arranged between the two transmission elements 20, 22 and around the shank of the screws 21, such that the transmission elements 20, 22 can be moved towards each other against a restoring force of the helical springs 25 in an actuation direction 26.

Figure 2:
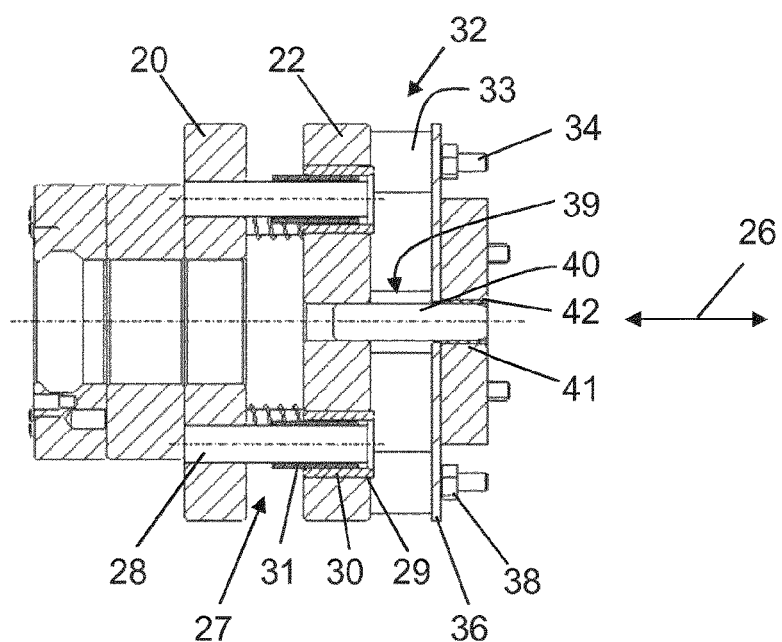
FIG. 2 is a cross section, rotated by 90°, of the connection element of the screwing device from FIG. 1.

The two transmission elements 20, 22 are additionally coupled by means of a guide 27 which is shown in greater detail in FIG. 2. The guide 27 consists of a cylindrical guide rod 28 that is rigidly connected to the first transmission element 20 and is oriented in the actuation direction 26. The second transmission element 22 comprises a recess 29 in which a hollow cylindrical guide bush 30 is arranged. The recess 29 and the guide bush 30 are arranged such that the guide rod 28 can be inserted into the guide bush 30. A ball retainer 31 is arranged between the guide rod 28 and the guide bush 30 so as to be in parallel with the actuation direction 26, which retainer rolls both on the guide rod 28 and on the guide bush 30. The guide 27 thus ensures that the two transmission elements 20, 22 can be displaced relative to one another only in the actuation direction 26. The connection element 10 comprises two identically designed guides 27.

A damper 32 which damps impacts introduced by a tool 45 adjoins the second transmission element 22 on the side opposite the first transmission element 20. The damper 32 comprises a total of six uniformly distributed rubber buffers 33, in which set screws 34, oriented in the actuation direction 26, are cast on either side. The rubber buffers 33 are screwed into corresponding threaded holes 35 in the second transmission element 22. A cover element 36 comprising through-holes 37 adjoins on the other side, through each of which holes a set screw 34 of the rubber buffer 33 protrudes. The cover element 36 is fixed to the rubber buffers 33 by means of nuts 38 screwed onto the set screws 34. The damper 32 comprises a guide 39 which prevents deformation of the rubber buffers 33 transversely to the actuation direction 26. In addition, the guide 39 comprises a pin 40 that is oriented in the actuation direction and is rigidly connected to the second transmission element 22, and a corresponding recess 41 that is formed on the cover element 36 and in which the pin 40 can be inserted and can rotate in the actuation direction 26. An anti-friction bush 42 is also arranged in the recess 41.

The cover element 36 is rigidly connected to an adapter element 43 on the side opposite the second transmission element 22. The adapter element 43 has an inner contour (not shown) that corresponds to a handle 44 of the tool that is in the form of an actuatable screwdriver 45. The adapter element 42 can be opened and can be closed again after the screwdriver 45 has been inserted. The screwdriver 45 can thus be immovably coupled to the adapter element 43, but it is also possible for the tool to be exchanged. The connection element 10 and the screwdriver 45 together form a screwing device 5. The damper 32 is arranged in the force flow between the screwdriver 45 and the second quick-change connector 15. The second quick-change connector 15 can be considered to be a connector element that allows the screwing device 5 to be connected to the robot arm 11.

It is also possible for the screwing device not to comprise a damper.

A hexagonal screw head (not shown) of a screw 47 oriented in the actuation direction 26 is received on a tip 46 of the screwdriver 45. The screw 47 can be screwed into a fastening hole 48 in a wall 49 by means of the screwdriver 45. The screw 47 is in particular designed as a screw anchor which can be screwed in directly and without the use of an insert.

In order to screw in the screw 47, the robot arm 11 can exert an actuating force on the screwing device 5 or the screwdriver 45, and thus on the screw 47, in the actuation direction 26 by means of the connection element 10. In order to set the actuating force, the connection element 10 comprises a distance measuring element 50 that is arranged on the intermediate element 19 and thus in a fixed manner relative to the first transmission element 20. A distance sensor 51 of the distance measuring element 50 which can transmit and receive a laser beam is oriented towards the second transmission element 22 in the actuation direction 26, such that the distance measuring element 50 can measure the distance between the distance sensor 51 and the second transmission element 22. The fixed arrangement of the distance measuring element 50 and of the distance sensor 51 relative to the first transmission element 20 means that it is possible to determine therefrom the spacing between the two transmission elements 20, 22, such that the measured distance represents the spacing between the two transmission elements 20, 22 in the actuation direction.

The distance measuring element 50 transfers the measured distance to the robot controller 13 via a signal terminal 52. The robot controller 13 can actuate the robot arm 11 and the screwdriver 45 in such a way, and thus actuate the connection element 10 including the screwdriver 45 in such a way that the measured distance is within a specified range and is in particular constant. The setting can be carried out by means of a PID controller for example, either the speed of the screwdriver 45 towards the wall 49, i.e. in the actuation direction 26, or the rotational speed of the screwdriver 45 being used as the control variable for the PID controller. Since the two transmission elements 20, 22 can be moved towards each other only against the restoring force of the helical springs 25, the actuating force acting on the screwdriver 45 can be concluded directly from the measured distance, as a result of which the actuating force is indirectly set by setting the measured distance. The mentioned range may be selected, for example, such that the actuating force is between 20 and 100 N, in particular is approximately 50 N. In this case, the distance to be set for this purpose is dependent on the dimensions and the arrangement of the individual components of the connection element 10 and in particular also on the spring constants of the helical springs 21.

Figure 3:
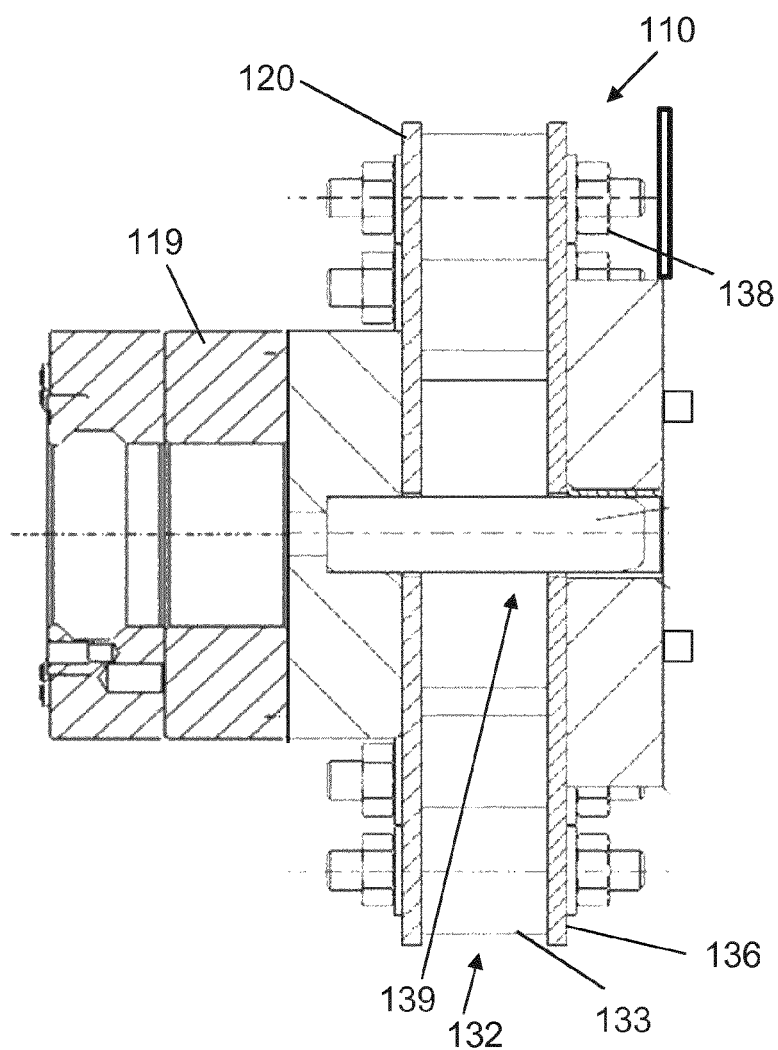
FIG. 3 shows a simplified embodiment of a connection element.

FIG. 3 shows a connection element 110 in an embodiment that is simplified compared with the connection element 10 from FIG. 1. The connection element 110 is designed similarly to the connection element 10, and therefore only the differences between the connection elements 10, 110 will be discussed.

The connection element 110 does not comprise two transmission elements that can be displaced relative to one another. Instead of two transmission elements, the connection element 110 comprises just one transmission element 120 that is rigidly connected to an intermediate element 119. Rubber buffers 133 that are fixed by nuts 138 are arranged between the transmission element 120 and a cover element 136. The rubber buffers 133 are therefore components of a damper 132 that also comprises a guide 139.

Figure 4:
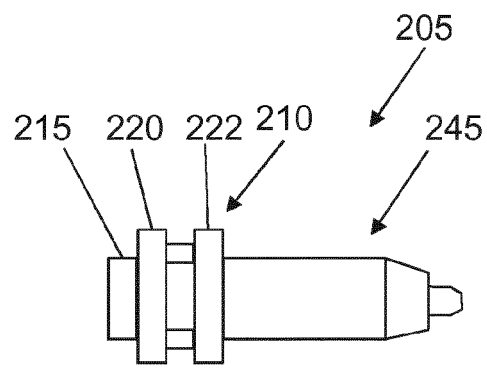
FIG. 4 shows a second embodiment of a screwing device.

FIG. 4 shows a screwing device 205 comprising a screwdriver 245 and a connection element 210, in which a particular screwdriver 245 is used that is not intended to be guided by hand. The screwing device 205 is designed very similarly to the screwing device 5 from FIG. 1, and therefore only the differences between the screwing devices will be discussed.

The screwdriver 245 does not comprise a handle, by means of which a connection to the connection element 210 can be established. Instead, the screwdriver 245 is connected directly to a second transmission element 222. Just as in the case of the connection element 10 of the screwing device 5 from FIG. 1, the second transmission element 222 is coupled to a first transmission element 220 that is connected, on an opposing side, to a second quick-change connector 215. The screwing device 205 therefore does not comprise a damper.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A screwing device including a screwdriver and a connection element for coupling the screwdriver to a robot arm, wherein the connection element comprises:
    a first, robot-side transmission element;
    a second, tool-side transmission element;
    a restoring element arranged between the first transmission element and the second transmission element;
    a distance measuring element, wherein the first and second transmission elements are moveable towards each other against a restoring force of the restoring element in an actuation direction and the distance measuring element measures a distance representing a spacing between the first and second transmission elements in the actuation direction; and
    a guide coupling the first transmission element and the second transmission element, the guide limiting displacement of the first and second transmission elements relative to one another only in the actuation direction.

2. The screwing device according to claim 1 wherein the restoring element is at least one spring.

3. The screwing device according to claim 2 wherein the at least one spring is a helical spring arranged around a fastening element that connects the first transmission element to the second transmission element and sets a predetermined spacing between the first and second transmission elements.

4. The screwing device according to claim 1 wherein the distance measuring element includes a distance sensor fixed relative to the first transmission element, and the distance measuring element measures a spacing of the distance sensor from the second transmission element.

5. The screwing device according to claim 4 wherein the distance sensor is an optical distance sensor.

6. The screwing device according to claim 1 wherein the guide includes at least one ball retainer arranged between the first transmission element and the second transmission element and extending parallel to the actuation direction.

7. The screwing device according to claim 1 including a damper attached to the second transmission element.

8. The screwing device according to claim 7 wherein, when the screwdriver is coupled to the robot arm by the connection element, the damper is arranged between the screwdriver and a connector making a connection to the robot arm.

9. The screwing device according to claim 7 wherein the damper includes a guide that prevents a deformation of the damper transversely to the actuation direction.

10. The screwing device according to claim 7 wherein the damper is arranged on a side of the second transmission element opposite to the first transmission element.

11. The screwing device according to claim 1 including a quick-change connector adapted for coupling to the robot arm without manual intervention.

12. A method for screwing a screw into a wall using the screwing device according to claim 1 coupled to a robot arm comprising the steps of:
    guiding the screwing device towards the wall to apply an actuating force in the actuation direction;
    sensing a variable characteristic of the actuating force while the screwing device is guided towards the wall; and
    actuating the screwing device to maintain the variable within a specifiable range.

13. The method according to claim 12 including setting the variable to a constant value.

* * * * *